US012686314B2

(12) United States Patent
Salvi

(10) Patent No.: US 12,686,314 B2
(45) Date of Patent: Jul. 21, 2026

(54) SELECTIVELY DEPLOYABLE OTTOMAN FOR A VEHICLE

(71) Applicant: GM Global Technology Operations LLC, Detroit, MI (US)

(72) Inventor: Daniel Lopez De Salvi, Burbank, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 183 days.

(21) Appl. No.: 18/597,098

(22) Filed: Mar. 6, 2024

(65) Prior Publication Data

US 2025/0282271 A1    Sep. 11, 2025

(51) Int. Cl.
*B60N 2/90* (2018.01)
*B60N 3/06* (2006.01)

(52) U.S. Cl.
CPC ............. *B60N 2/995* (2018.02); *B60N 3/063* (2013.01)

(58) Field of Classification Search
CPC .......... B60N 2/995; B60N 3/06; B60N 3/063; A47C 1/034; A47C 7/50
See application file for complete search history.

(56) References Cited

U.S. PATENT DOCUMENTS

| | | | | | |
|---|---|---|---|---|---|
| 3,065,992 | A | * | 11/1962 | Nagel | B60N 3/063 |
| | | | | | 297/423.46 |
| 2013/0145972 | A1 | * | 6/2013 | Knox | B60N 2/24 |
| | | | | | 108/147 |

FOREIGN PATENT DOCUMENTS

| | | |
|---|---|---|
| JP | 2009078671 A | 4/2009 |
| JP | 2019018622 A | 2/2019 |

OTHER PUBLICATIONS

German Application No. 10 2024 112 453.9 filed May 3, 2024; German Office Action dated Oct. 28, 2024; 5 pages.

* cited by examiner

*Primary Examiner* — Timothy D Collins
*Assistant Examiner* — Eric Acosta
(74) *Attorney, Agent, or Firm* — CANTOR COLBURN LLP

(57)                ABSTRACT

A selectively deployable ottoman includes a base member including an adjustment axis and an ottoman assembly connected to the base member. The ottoman assembly includes a first member having a first end and a second end. The first end being connected to the base member. A second member has a first end portion and a second end portion. The first end portion being pivotally connected to the second end of the first member. A third member includes a first end section and a second end section. The first end section is pivotally connected to the second end portion of the second member. A connector member operatively connects the first end of the first member to the base member. The connector member being shiftable along the adjustment axis of the base member to selectively deploy the ottoman assembly.

20 Claims, 6 Drawing Sheets

SELECTIVELY DEPLOYABLE OTTOMAN FOR A VEHICLE

INTRODUCTION

The subject disclosure relates to the art of vehicles and, more particularly, to a selectively deployable ottoman for a vehicle.

Modern vehicles include amenities that would have never entered the imagination of designers of luxury cars of old, let alone to the design of a passenger vehicle slated for wide use. Many modern cars include movie screens, video players, surround sound, reclining seats, and the like. Vehicle manufacturers strive to increase occupant comfort for all vehicles, especially autonomous and semi-autonomous vehicles. As autonomous and semi-autonomous vehicles develop, the need to develop new amenities that further increase occupant comfort increases.

Sitting for prolonged periods in a vehicle seat has been shown to increase occupant discomfort. Often times, frequent stops are integrated into longer trips. The stops provide passengers an opportunity to get out, stretch, and otherwise change body position. Increasing occupant comfort, particularly leg comfort, may lead to better ergonomics which may reduce the need to stop the vehicle and adjust body position. Increasing leg comfort will therefore reduce unnecessary stops. Accordingly, it is desirable to provide a selectively deployable leg support in vehicle occupant spaces.

SUMMARY

A selectively deployable ottoman for a vehicle, in accordance with a non-limiting example, includes a base member including an adjustment axis and an ottoman assembly connected to the base member. The ottoman assembly including a first member including a first end and a second end that is opposite the first end. The first end being connected to the base member. A second member has a first end portion and a second end portion that is opposite the first end portion. The first end portion being pivotally connected to the second end of the first member. A third member includes a first end section and a second end section that is opposite the first end section. The first end section is pivotally connected to the second end portion of the second member. A connector member operatively connects the first end of the first member to the base member. The connector member being shiftable along the adjustment axis of the base member to selectively deploy the ottoman assembly.

In addition to one or more of the features described herein a first pivot axis and a second pivot axis arranged at the second end portion of the third member.

In addition to one or more of the features described herein the first pivot axis and the second pivot axis comprise an axle that extends through the third member.

In addition to one or more of the features described herein a torsion spring arranged about one of the first pivot axis and the second pivot axis.

In addition to one or more of the features described herein a first deployment member operatively connected between the second end of the first member and the second end portion of the third member.

In addition to one or more of the features described herein a second deployment member operatively connected between the first end of the first member and the second end portion of the second member.

In addition to one or more of the features described herein the first deployment member comprises a first linear actuator including a first housing and a first piston that is selectively extendable from the first housing and the second deployment member comprises a second linear actuator including a second housing and a second piston that is selectively extendable from the second housing.

In addition to one or more of the features described herein the first housing is pivotally connected to the second end portion of the third member and the first piston is pivotally connected to the second end of the first member and the second housing is pivotally connected to the second end section of the second member and the first end of the first member.

In addition to one or more of the features described herein a first guide member and a second guide member secured to the base member, the connector member being operatively connected to the first guide member and the second guide member.

In addition to one or more of the features described herein the base member is mounted to a floor surface of the vehicle, the base member being selectively shiftable relative to the floor surface along the adjustment axis.

A vehicle, in accordance with a non-limiting example, includes a body including a passenger compartment having a floor surface and a selectively deployable ottoman arranged in the passenger compartment. The selectively deployable ottoman including a base member connected to the floor surface, the base member including an adjustment axis and an ottoman assembly connected to the base member. The ottoman assembly includes a first member including a first end and a second end that is opposite the first end. The first end being connected to the base member. A second member has a first end portion and a second end portion that is opposite the first end portion. The first end portion is pivotally connected to the second end of the first member. A third member includes a first end section and a second end section that is opposite the first end section. The first end section is pivotally connected to the second end portion of the second member. A connector member operatively connecting the first end of the first member to the base member. The connector member is shiftable along the adjustment axis of the base member to selectively deploy the ottoman assembly.

In addition to one or more of the features described herein a first pivot axis and a second pivot axis arranged at the second end portion of the third member.

In addition to one or more of the features described herein the first pivot axis and the second pivot axis comprise an axle that extends through the third member.

In addition to one or more of the features described herein a torsion spring arranged about one of the first pivot axis and the second pivot axis.

In addition to one or more of the features described herein a first deployment member operatively connected between the second end of the first member and the second end portion of the third member.

In addition to one or more of the features described herein a second deployment member operatively connected between the first end of the first member and the second end portion of the second member.

In addition to one or more of the features described herein the first deployment member comprises a first linear actuator including a first housing and a first piston that is selectively extendable from the first housing and the second deployment member comprises a second linear actuator including a second housing and a second piston that is selectively extendable from the second housing.

In addition to one or more of the features described herein the first housing is pivotally connected to the second end portion of the third member and the first piston is pivotally connected to the second end of the first member and the second housing is pivotally connected to the second end section of the second member and the first end of the first member.

In addition to one or more of the features described herein a first guide member and a second guide member secured to the base member, the connector member being operatively connected to the first guide member and the second guide member.

In addition to one or more of the features described herein the base member is selectively shiftable relative to the floor surface along the adjustment axis.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
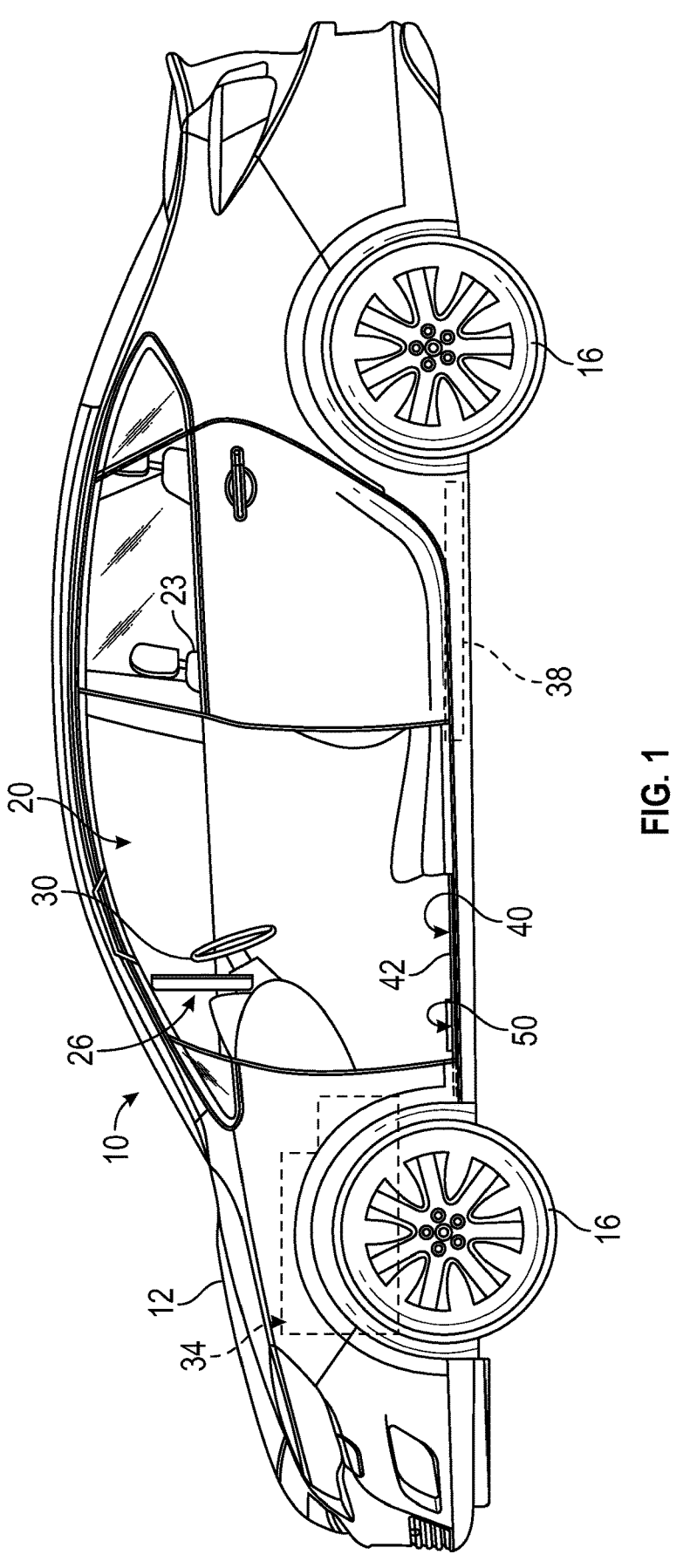
FIG. 1 is a left side view of a vehicle having a door removed to depict a selectively deployable ottoman in a stowed configuration, in accordance with a non-limiting example.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle, in accordance with a non-limiting example, is indicated generally at 10 in FIG. 1. Vehicle 10 includes a body 12 supported on a plurality of wheels 16. Body 12 defines, in part, a passenger compartment 20 having seats 23 positioned behind a dashboard 26. Passenger compartment 20 is accessed through a door (not shown in order to enhance clarity). A steering control 30 is arranged between seats 23 and dashboard 26. Steering control 30 is operated to control orientation of select ones of the plurality of wheels 16.

Vehicle 10 includes an electric machine shown in the form of an electric drive unit 34 that provides power to one or more of the plurality of wheels 16. Electric drive unit 34 is operatively connected to a rechargeable energy storage system (RESS) or battery assembly 38. While shown as being an electric vehicle, it should be understood that vehicle 10 may be a hybrid vehicle or a vehicle powered by an internal combustion engine (ICE). Further, vehicle 10 may be an autonomous vehicle such that a driver need not manipulate controls, (i.e., steering, acceleration, braking etc.) Such controls, including steering, acceleration, braking, and the like could also be collapsed and hidden if and when vehicle 10 is in full autonomous driving mode. It should be understood that vehicle 10 may also take the form of a human operated vehicle.

Figure 2:
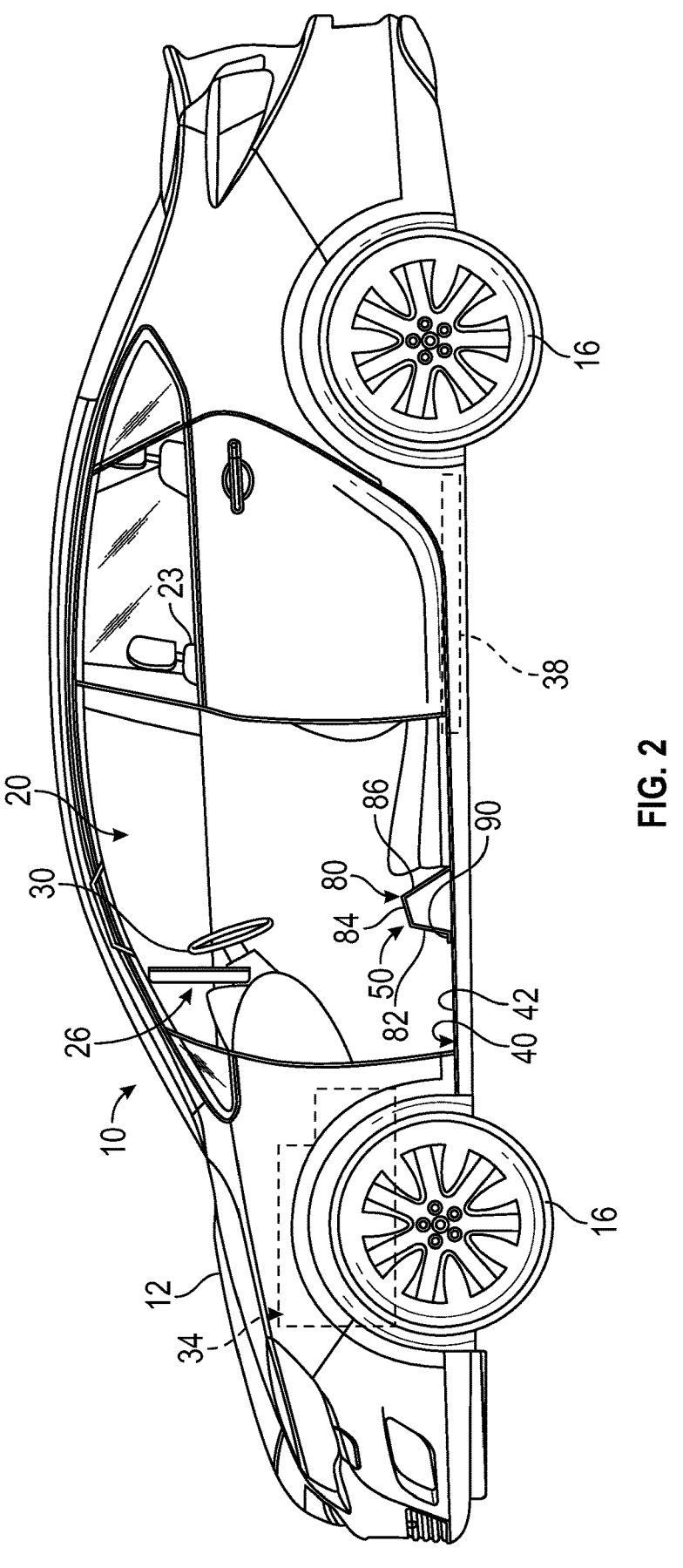
FIG. 2 is a left side view of a vehicle having a door removed to depict a selectively deployable ottoman in a calf support configuration, in accordance with a non-limiting example.
Figure 3:
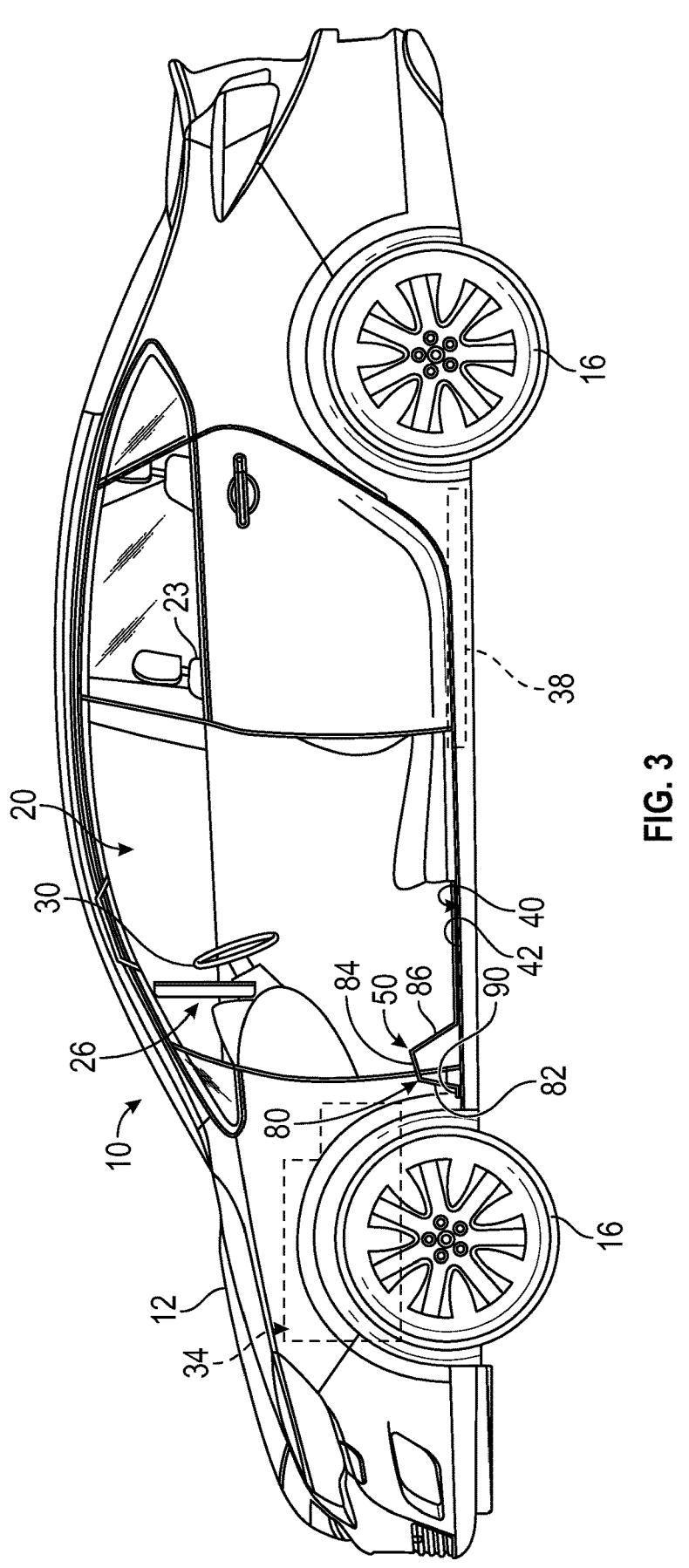
FIG. 3 is a left side view of a vehicle having a door removed to depict a selectively deployable ottoman in a foot rest configuration, in accordance with a non-limiting example.

In a non-limiting example, passenger compartment 20 includes a passenger compartment floor 40 having a floor surface 42. Floor surface 42 supports a selectively deployable ottoman 50. Selectively deployable ottoman 50 may transition from a first or stowed configuration as shown in FIG. 1, to a second or calf support configuration, such as shown in FIG. 2, and to a foot rest configuration, such as shown in FIG. 3. At this point it should be understood that while shown as being associated with a driver's position in passenger compartment 20, selectively deployable ottoman 50 may be arranged in other locations. The particular location(s) of selectively deployable ottoman 50 may vary and may depend on vehicle configuration (autonomous, semi-autonomous, human controlled).

Figure 4:
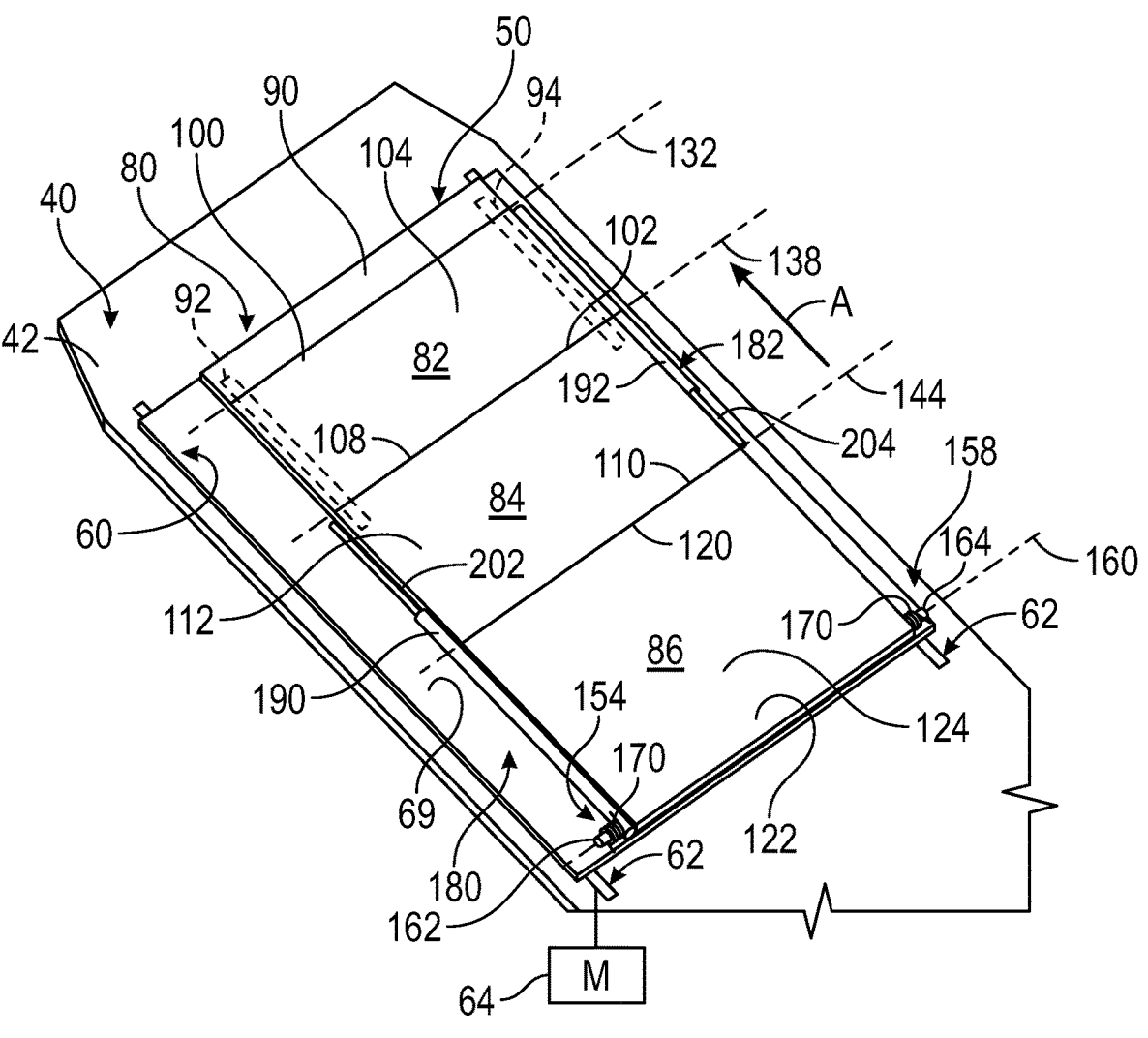
FIG. 4 is a plan view of the selectively deployable ottoman in the stowed configuration, in accordance with a non-limiting example.

In a non-limiting example shown in FIG. 4, selectively deployable ottoman 50 includes a base member 60 slideably connected to floor surface 42. Base member 60 is mounted to floor surface 42 through a guide track 62 that may include a motor 64. As will be detailed more fully herein, motor 64 is selectively controlled to shift base member 60 relative to floor surface 42 along an adjustment axis "A". In a non-limiting example, adjustment axis "A" extends along a longitudinal axis or fore-to-aft in passenger compartment 20. Base member 60 includes a support surface 69 that supports selectively deployable ottoman 50.

Figure 5:
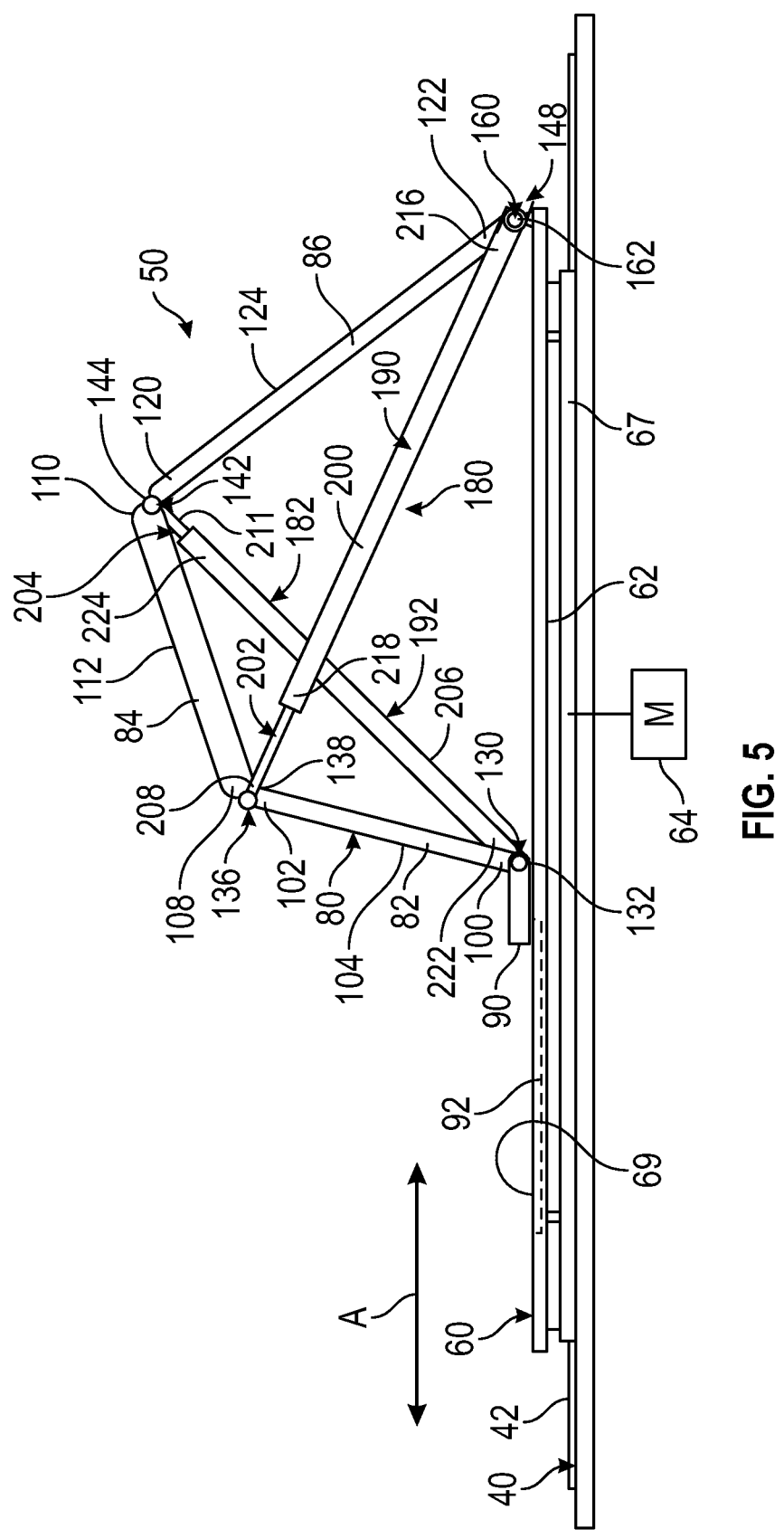
FIG. 5 is a side view of the selectively deployable ottoman in a deployed configuration, in accordance with a non-limiting example.

Reference will now follow to FIGS. 4 and 5 and with continued reference to FIG. 3 in describing selectively deployable ottoman 50 in accordance with a non-limiting example. Selectively deployable ottoman 50 includes an ottoman assembly 80 including a first member 82, a second member 84 operatively and pivotally connected to first member 82, and a third member 86 operatively and pivotally connected to second member 84. First member 82 is shiftably coupled to support surface 69 through a connector member 90. In a non-limiting example, connector member 90 transitions over support surface 69 through a first guide member 92 and a second guide member 94. First and second guide members 92 and 94 may be embedded in base member 60.

In a non-limiting example, first member 82 includes a first end 100 and a second end 102 that is opposite first end 100. First end 100 is separated from second end 102 by a first support surface 104. Second member 84 includes a first end portion 108 and a second end portion 110 that is opposite first end portion 108. First end portion 108 is separated from second end portion 110 by a second support or calf support surface 112. Third member 86 includes a first end section 120 and a second end section 122 that is opposite to first end section 120. First end section 120 is separated from second end section 122 by a foot rest surface 124.

Referring to FIG. 5 and with continued reference to FIG. 4, first end 100 of first member 82 is coupled to connector member 90 through a first hinge 130 that defines a first pivot axis 132. First hinge 130 may comprise a single hinge that extends along a width of first member 82 or may comprise multiple hinge elements. First end portion 108 of second member 84 is coupled to second end 102 of first member 82 through a second hinge 136 that defines a second pivot axis 138. In a manner similar to that described with respect to first hinge 130, second hinge 136 may comprise a single hinge that extends along a width of second member 84 or may comprise multiple hinge elements.

First end section 120 of third member 86 is coupled to second end portion 110 of second member 84 through a third hinge 142 that defines a third pivot axis 144. In a manner similar to that described with respect to first hinge 130 and second hinge 136, third hinge may comprise a single hinge that extends along a width of third member 86 or may comprise multiple hinge elements. A fourth hinge 148 that defines a fourth pivot axis 160 is arranged at second end section 122 of third member 86. Fourth hinge 148 may be formed from one or more hinge elements.

Figure 6:
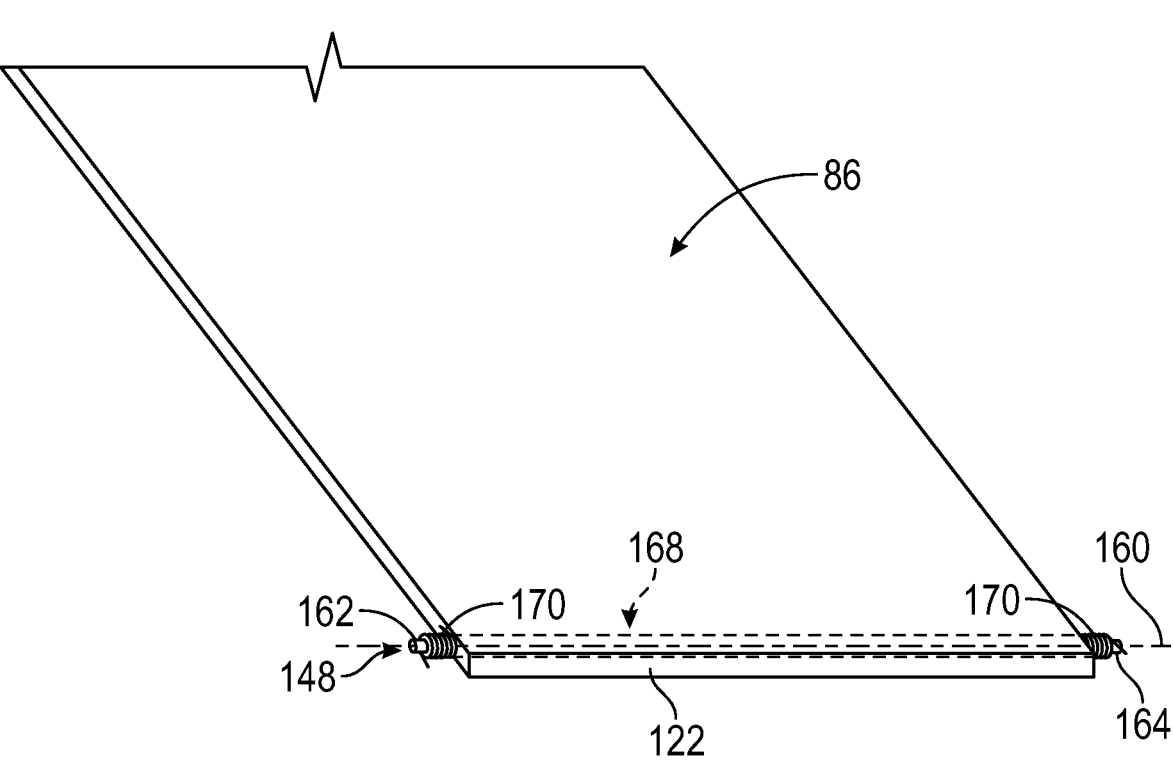
FIG. 6 is a detail view of first and second torsion springs on the selectively deployable ottoman, in accordance with a non-limiting example.

In an example shown in FIG. 6 and with continued reference to FIG. 5, second end section 122 includes a first pivot 162 and a second pivot 164. First pivot 162 and second pivot 164 may be embodied in an axle 168 that defines fourth pivot axis 160. Axle 168 may define a continuous member that extends across a width of third member 86 or may define discrete axles that embody first pivot 162 and second pivot 164 respectively. Axle 168 may support one or more torsion springs 170 that control deployment of selectively deployable ottoman 50 as will be detailed more fully herein.

In a non-limiting example, selectively deployable ottoman 50 includes a first deployment member 180 and a second deployment member 182. First deployment member 180 and second deployment member 182 are selectively activated to transition ottoman assembly 80 between the stowed configuration (FIG. 1) and a deployed configuration (FIG. 2 and FIG. 3). First deployment member 180 may take the form of a first linear actuator 190 and second deployment member 182 may take the form of a second linear actuator 192. At this point, it should be understood that first deployment member 180 and second deployment member 182 may take on various forms including systems that rely on non-linear actuation such as rotation, or hybrid systems that may rely on linear and non-linear actuation.

First linear actuator 190 includes a first housing 200 and a first piston 202. Second linear actuator 192 includes a second piston 204 and a second housing 206. First piston 202 includes a first piston end 208 connected to second end 102 of first member 82 and a second piston end (not shown) that extends into first housing 200. Second piston 204 includes a first piston end portion 211 connected to second end portion 110 of second member 84 and a second piston end portion (not shown) that extends into second housing 206. First housing 200 includes a first housing end 216 connected to second end section 122 of third member 86 and a second housing end 218 that is receptive of the second piston end of first piston 202. Similarly, second housing 206 includes a first housing end section 222 connected to first end 100 of first member 82 and a second housing end section 224 that is receptive of the second piston end portion 110.

From the stowed configuration, contraction of first piston 202 into first housing 200 and second piston 204 into second housing 206 causes ottoman assembly 80 to rise relative to base member 60. As ottoman assembly 80 lifts, third member 86 rotates about first pivot 162 and second pivot 164. Connector member 90 transitions over support surface 69 along adjustment axis "A" in first guide member 92 and second guide member 94. As third member 86 rotates, torsion spring 170 is loaded so as to control movement speed and promote rotation in a selected direction. At this point, motor 64 may be activated to shift base member 60 along floor surface in order to position ottoman assembly 80 the second or calf support configuration, such as shown in FIG. 2, or the foot rest configuration, such as shown in FIG. 3. Of course, it should be understood that base member 60 may be shifted before ottoman assembly 80 moves, or base member 60 and ottoman assembly 80 may move in unison.

Figure 7:
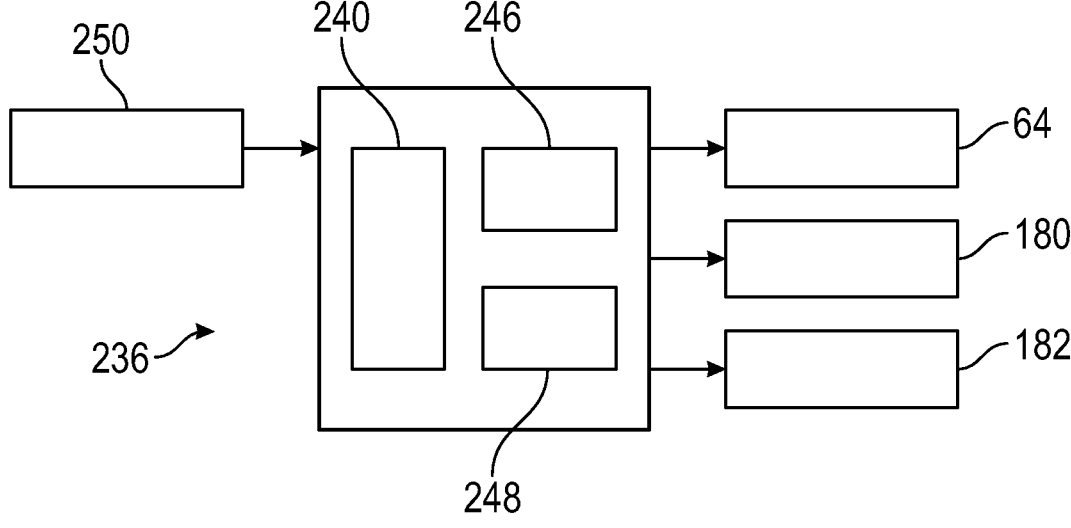
FIG. 7 is a block diagram illustrating a control system for the selectively deployable ottoman, in accordance with a non-limiting example.

In a non-limiting example shown in FIG. 7, vehicle 10 includes an ottoman control system 236 operatively connected to motor 64 associated with movement of base member 60 as well as first deployment member 180 and second deployment member 182. Ottoman control system 236 includes a central processing unit (CPU) 240, a non-volatile memory 246, and an ottoman controller 248. Ottoman control system 236 may also include sensors that record ottoman position. Ottoman position may also simply be temporarily stored in non-volatile memory 246. Vehicle 10 may include a toggle 250 that selectively controls deployment of ottoman assembly 80. Ottoman assembly 80 may be deployed to increase passenger comfort on longer rides thereby reducing the need for or frequency of unscheduled stops.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A selectively deployable ottoman for a vehicle, the selectively deployable ottoman comprising:

a base member including an adjustment axis; and an ottoman assembly connected to the base member, the ottoman assembly comprising:

a first member including a first end and a second end that is opposite the first end, the first end being connected to the base member;

a second member having a first end portion and a second end portion that is opposite the first end portion, the first end portion being pivotally connected to the second end of the first member;

a third member including a first end section and a second end section that is opposite the first end section, the first end section being pivotally connected to the second end portion of the second member; and a connector member operatively connecting the first end of the first member to the base member, the connector member being linearly slidable along the adjustment axis with respect to the base member to selectively deploy the ottoman assembly.

2. The selectively deployable ottoman according to claim 1, further comprising a first pivot axis and a second pivot axis arranged at the second end portion of the third member.

3. The selectively deployable ottoman according to claim 2, wherein the first pivot axis and the second pivot axis comprise an axle that extends through the third member.

4. The selectively deployable ottoman according to claim 3, further comprising a torsion spring arranged about one of the first pivot axis and the second pivot axis.

5. The selectively deployable ottoman according to claim 1, further comprising a first deployment member operatively connected between the second end of the first member and the second end portion of the third member.

6. The selectively deployable ottoman according to claim 1, wherein the base member is mounted to a floor surface of the vehicle, the base member being selectively shiftable relative to the floor surface along the adjustment axis.

7. A selectively deployable ottoman for a vehicle, the selectively deployable ottoman comprising:

a base member including an adjustment axis; and an ottoman assembly connected to the base member, the ottoman assembly comprising:

a first member including a first end and a second end that is opposite the first end, the first end being connected to the base member;

a second member having a first end portion and a second end portion that is opposite the first end portion, the first end portion being pivotally connected to the second end of the first member;

a third member including a first end section and a second end section that is opposite the first end section, the first end section being pivotally connected to the second end portion of the second member;

a connector member operatively connecting the first end of the first member to the base member, the connector member being shiftable along the adjustment axis of the base member to selectively deploy the ottoman assembly;

a first deployment member operatively connected between the second end of the first member and the second end portion of the third member; and a second deployment member operatively connected between the first end of the first member and the second end portion of the second member.

8. The selectively deployable ottoman according to claim 7, wherein the first deployment member comprises a first linear actuator including a first housing and a first piston that is selectively extendable from the first housing and the second deployment member comprises a second linear actuator including a second housing and a second piston that is selectively extendable from the second housing.

9. The selectively deployable ottoman according to claim 8, wherein the first housing is pivotally connected to the second end portion of the third member and the first piston is pivotally connected to the second end of the first member and the second housing is pivotally connected to the second end section of the second member and the first end of the first member.

10. The selectively deployable ottoman according to claim 9, further comprising a first guide member and a second guide member secured to the base member, the connector member being operatively connected to the first guide member and the second guide member.

11. A vehicle comprising:

a body including a passenger compartment having a floor surface; and a selectively deployable ottoman arranged in the passenger compartment, the selectively deployable ottoman comprising:

a base member connected to the floor surface, the base member including an adjustment axis; and an ottoman assembly connected to the base member, the ottoman assembly comprising:

a first member including a first end and a second end that is opposite the first end, the first end being connected to the base member;

a second member having a first end portion and a second end portion that is opposite the first end portion, the first end portion being pivotally connected to the second end of the first member;

a third member including a first end section and a second end section that is opposite the first end section, the first end section being pivotally connected to the second end portion of the second member; and a connector member operatively connecting the first end of the first member to the base member, the connector member being linearly slidable along the adjustment axis with respect to the base member to selectively deploy the ottoman assembly.

12. The selectively deployable ottoman according to claim 11, further comprising a first pivot axis and a second pivot axis arranged at the second end portion of the third member.

13. The selectively deployable ottoman according to claim 12, wherein the first pivot axis and the second pivot axis comprise an axle that extends through the third member.

14. The selectively deployable ottoman according to claim 13, further comprising a torsion spring arranged about one of the first pivot axis and the second pivot axis.

15. The selectively deployable ottoman according to claim 11, further comprising a first deployment member operatively connected between the second end of the first member and the second end portion of the third member.

16. The selectively deployable ottoman according to claim 15, further comprising a second deployment member operatively connected between the first end of the first member and the second end portion of the second member.

17. The selectively deployable ottoman according to claim 16, wherein the first deployment member comprises a first linear actuator including a first housing and a first piston that is selectively extendable from the first housing and the second deployment member comprises a second linear actuator including a second housing and a second piston that is selectively extendable from the second housing.

18. The selectively deployable ottoman according to claim 17, wherein the first housing is pivotally connected to the second end portion of the third member and the first piston is pivotally connected to the second end of the first member and the second housing is pivotally connected to the second end section of the second member and the first end of the first member.

19. The selectively deployable ottoman according to claim 18, further comprising a first guide member and a second guide member secured to the base member, the connector member being operatively connected to the first guide member and the second guide member.

20. The selectively deployable ottoman according to claim 11, wherein the base member is selectively shiftable relative to the floor surface along the adjustment axis.

\* \* \* \* \*